United States Patent [19]
McSherry

[11] Patent Number: 4,704,057
[45] Date of Patent: Nov. 3, 1987

[54] FASTENING ELEMENT

[75] Inventor: Thomas W. McSherry, Floral Park, N.Y.

[73] Assignee: Mechanical Plastics Corp., Pleasantville, N.Y.

[21] Appl. No.: 290,427

[22] Filed: Aug. 6, 1981

Related U.S. Application Data

[63] Continuation of Ser. No. 106,036, Dec. 21, 1979, abandoned, which is a continuation-in-part of Ser. No. 826,865, Aug. 22, 1977, Pat. No. 4,181,061, which is a continuation-in-part of Ser. No. 721,909, Sep. 15, 1976, abandoned.

[51] Int. Cl.$^4$ .................... F16B 13/06; F16B 21/00
[52] U.S. Cl. .................................... 411/55; 411/344; 411/345
[58] Field of Search ................ 411/15, 34, 35, 36, 411/37, 38, 340, 341, 342, 343, 344, 345, 346, 55

[56] References Cited

U.S. PATENT DOCUMENTS

| | | | |
|---|---|---|---|
| 761,277 | 5/1904 | Wilbur | 411/340 X |
| 1,106,983 | 8/1914 | Steiner | 411/340 X |
| 1,295,734 | 2/1919 | Greubel | 411/38 |
| 2,018,251 | 10/1935 | Croessant | 411/37 |
| 2,559,281 | 7/1951 | Croessant | 411/38 |
| 2,610,013 | 9/1952 | Gibson | 248/220.2 X |
| 2,897,694 | 8/1959 | Carney | 411/341 |
| 3,143,916 | 8/1964 | Rice | 411/37 |
| 3,174,387 | 3/1965 | Fischer | 411/37 |
| 3,213,745 | 10/1965 | Dwyer | 411/15 |
| 3,213,746 | 10/1965 | Dwyer | 411/15 |
| 3,487,746 | 1/1970 | Kapner | 411/37 |
| 3,651,734 | 3/1972 | McSherry | 411/15 |
| 4,079,655 | 3/1978 | Roberson | 411/344 |
| 4,143,581 | 3/1979 | Smith et al. | 411/340 |
| 4,152,968 | 5/1979 | Lassine | 411/38 |
| 4,221,154 | 9/1980 | McSherry | 411/34 |
| 4,274,324 | 6/1981 | Giannuzzi | 411/15 X |
| 4,415,299 | 11/1983 | Smith et al. | 411/15 |

FOREIGN PATENT DOCUMENTS

| | | | |
|---|---|---|---|
| 144117 | 11/1951 | Australia | 411/38 |
| 1305222 | 4/1962 | France | 411/38 |
| 406147 | 10/1943 | Italy | 411/342 |
| 1505595 | 3/1978 | United Kingdom | 411/38 |

Primary Examiner—Gary L. Smith
Attorney, Agent, or Firm—Israel Nissenbaum

[57] ABSTRACT

An improved fastening element for securement within an opening and of the type comprising (a) a head portion; (b) a connecting portion comprising a longitudinally extending body portion including a pair of opposed pillar-like parts, for insertion into such opening; and (c) at the end of said connecting portion remote from the head portion, locking means movable between a collapsed position in which the fastening element is insertable into the opening and an expanded position in which the locking means is effective in cooperation with an elongated retaining element inserted into the connecting portion to preclude removal of the fastening element from the opening. The improvement of the invention resides in the locking means which comprises:

(i) a pair of substantially rigid arms pivotally connected to said pillar-like parts at radial locations substantially adjacent to or within the radius of the body portion in the expanded position and whose proximal end portions are cantilevered for engagement with the elongated retaining element and disposed to pivot with respect to each other in a plane which includes the longitudinal axis of said body portion, whereby the arms are movable toward each other to a collapsed position and away from each other to an expanded position; and (ii) a pair of substantially rigid arms, each pivotally connected to one of arms (i) and pivotally connected to each other on the longitudinal axis of the body portion for engagement with the elongated retaining element, whereby such arms (ii) are movable toward each other to a collapsed position and away from each other to an expanded position. Each arm is substantially longer than the maximum transverse dimension of the body portion. The arms (i) and (ii) are conjointly movable in symmetric pantographic configuration between the collapsed and expanded positions in a plane which includes the longitudinal axis of the body portion.

18 Claims, 27 Drawing Figures

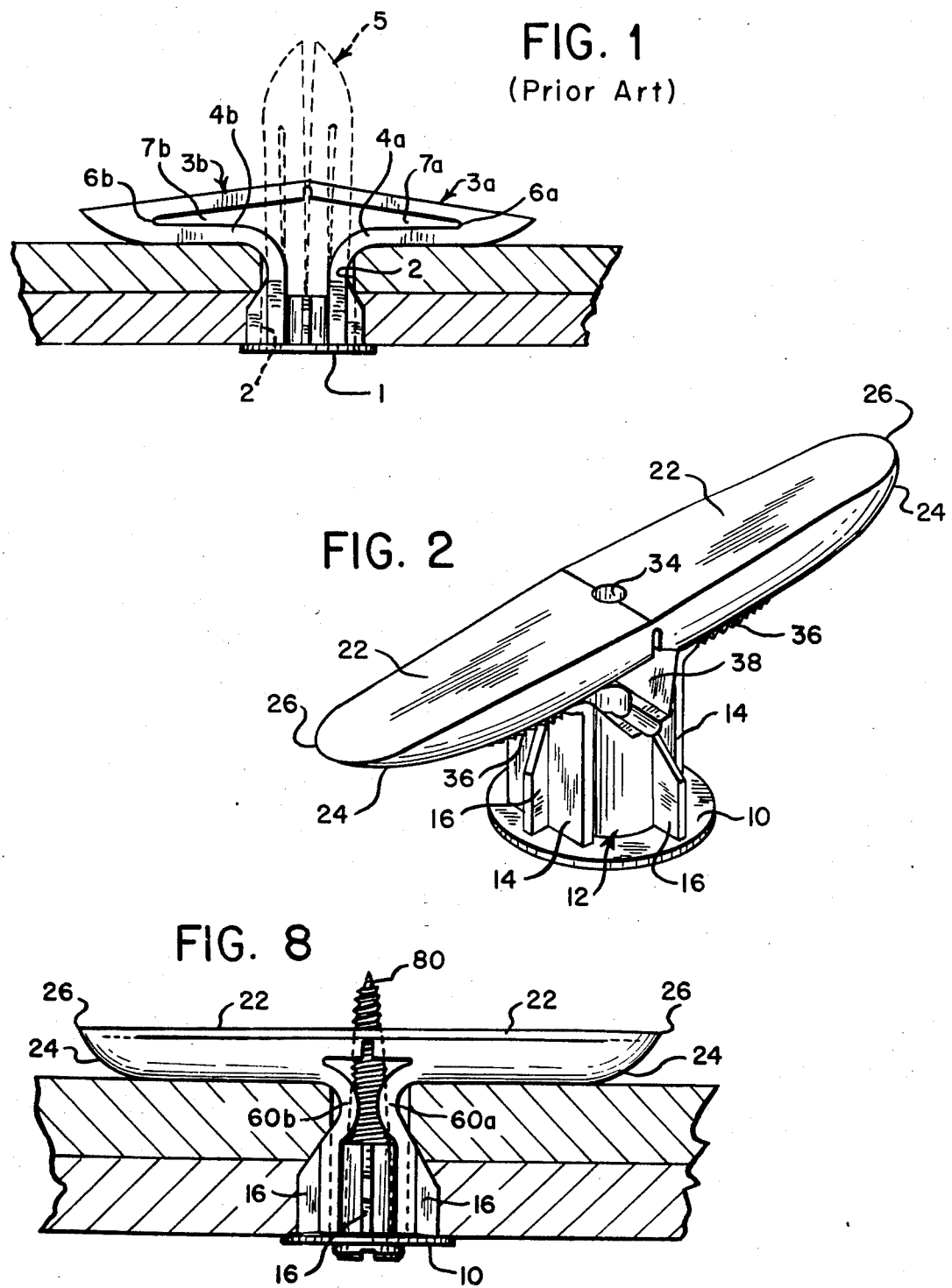

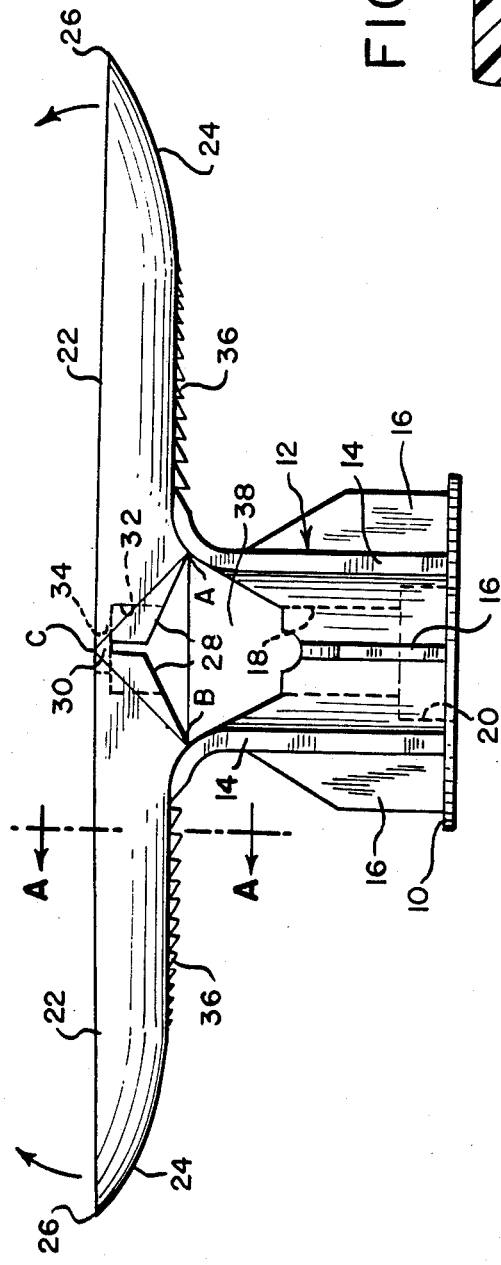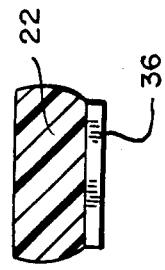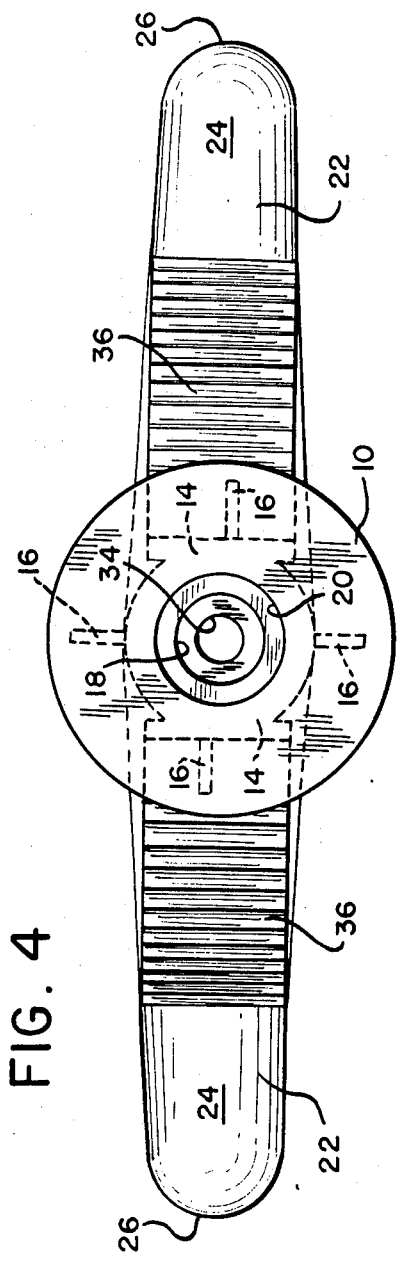

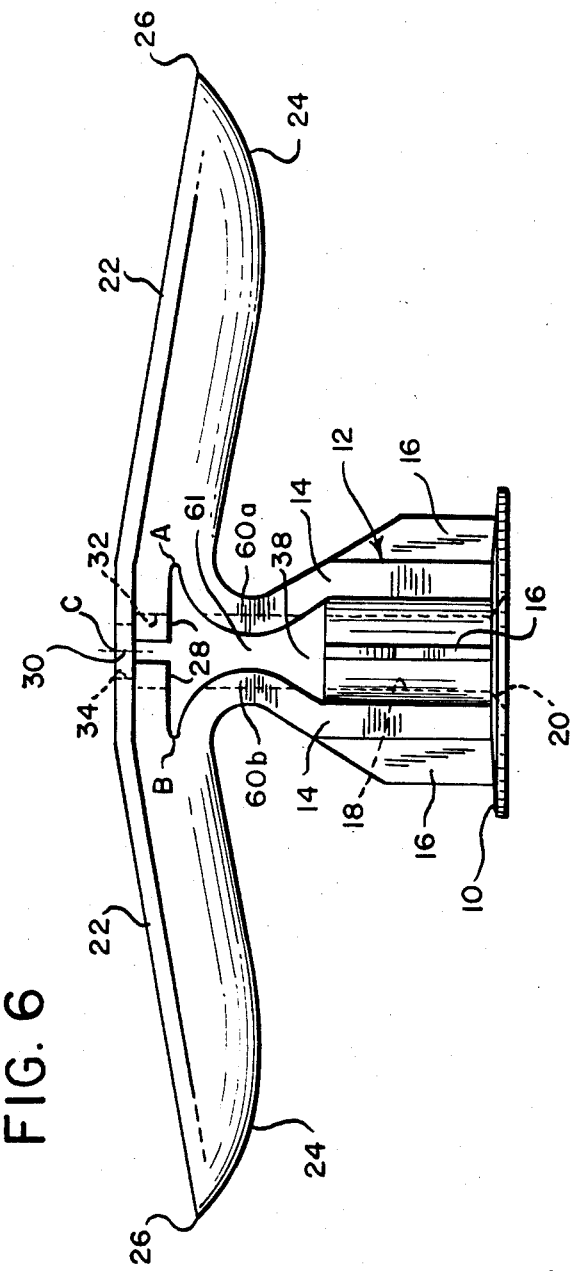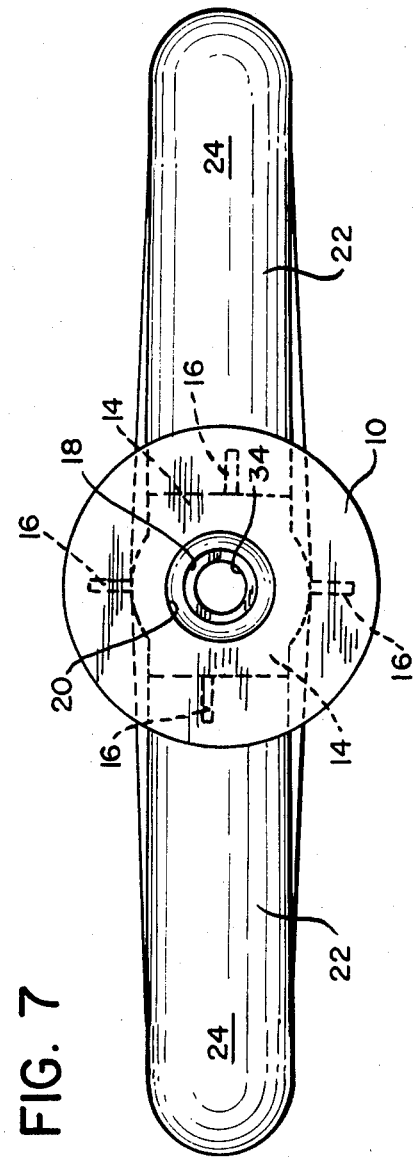

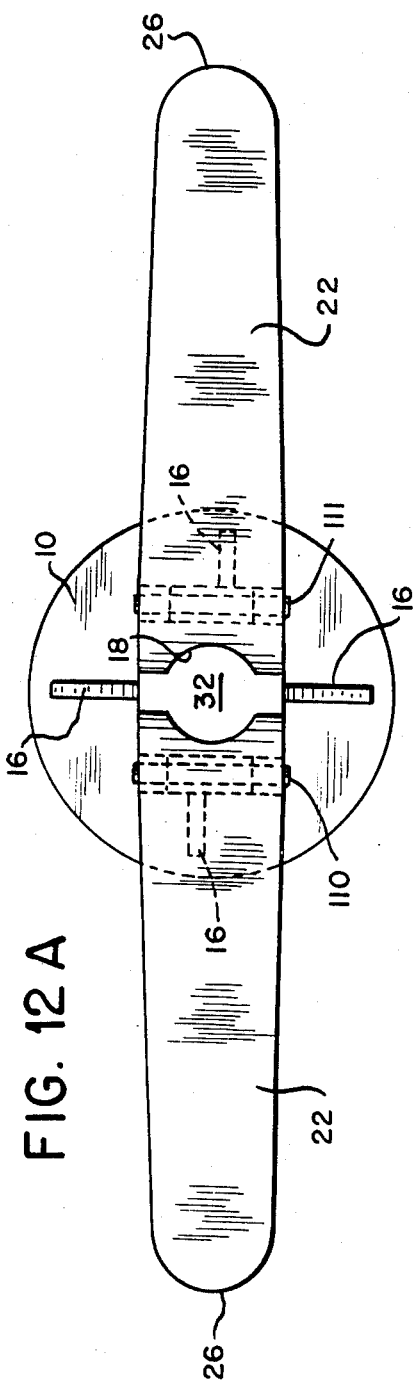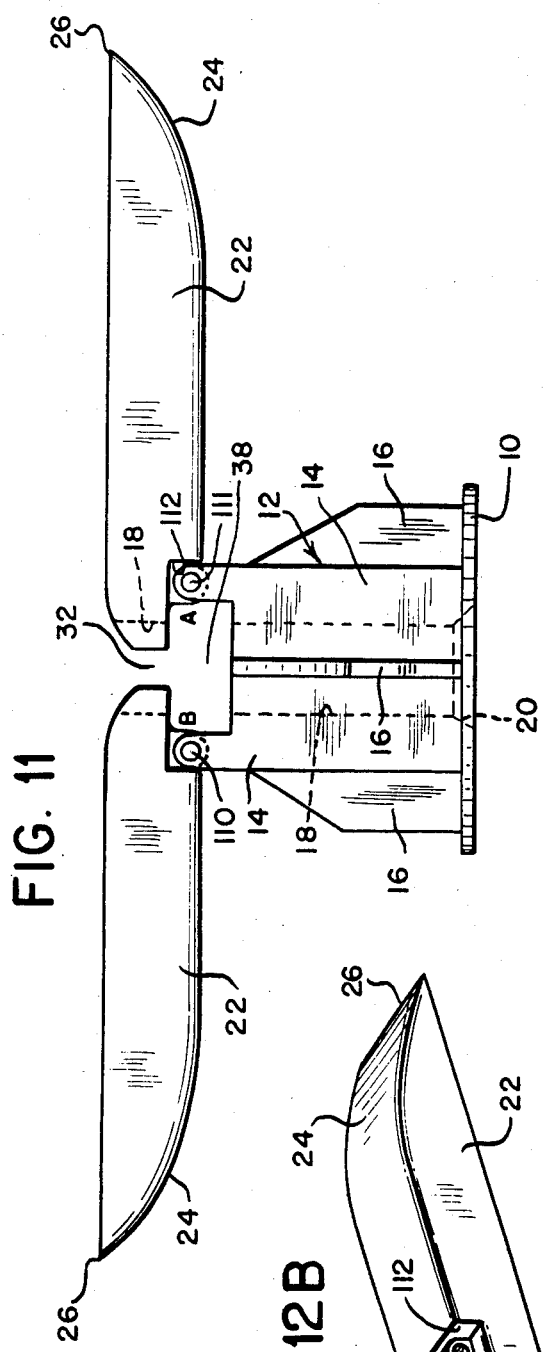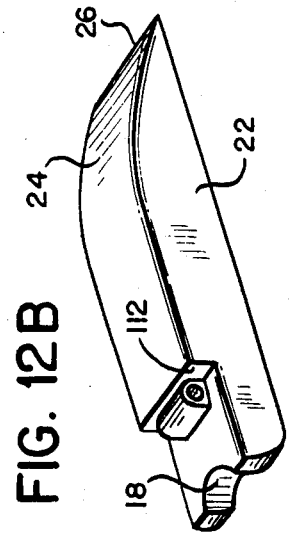

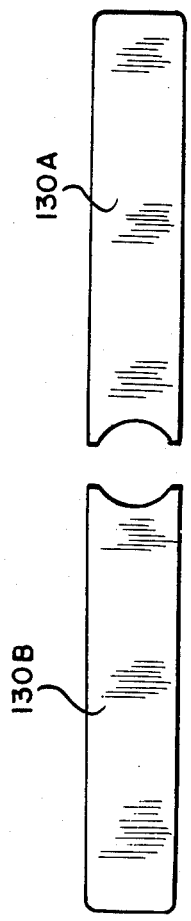
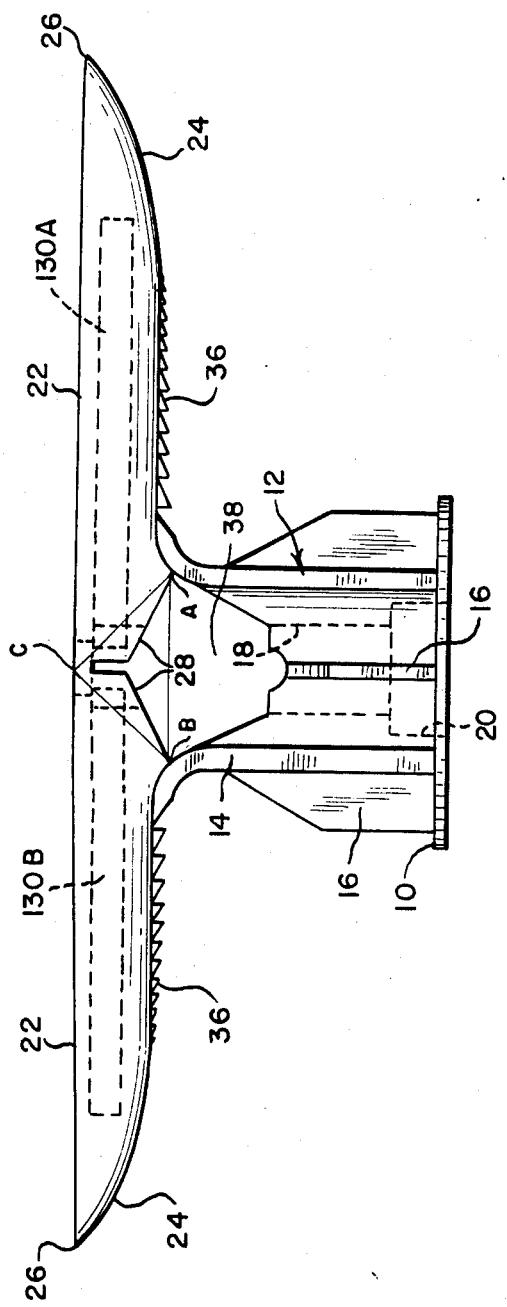
FIG. 13B
FIG. 13A

4,704,057

FASTENING ELEMENT

CROSS-REFERENCE TO RELATED APPLICATIONS

This is a continuation, of application Ser. No. 106,036, filed Dec. 21, 1979, now abandoned, which is a continuation-in-part of application Ser. No. 826,865 filed Aug. 22, 1977 now Pat. No. 4,181,061 which in turn is a continuation-in-part of application Ser. No. 721,909 filed Sept. 15, 1976, now abandoned.

TECHNICAL FIELD

This invention relates to fastening elements and, more particularly, to integrally molded plastic fastening elements of enhanced load bearing capability and ease of fabrication.

BACKGROUND ART

Integrally molded plastic fastening elements of the type disclosed in U.S. Pat. No. 3,651,734, issued to the present inventor on March 28, 1972, are rapidly gaining commercial acceptance, both here and abroad. These fastening elements comprise, in substance, a head for disposition at one end of an opening, expansible locking means for location at the other end of the opening, and flexible, spaced apart connectors extending therebetween.

More specifically, the above prior art fastening elements typically utilize relatively long connectors which extend radially outward far beyond the edges of the opening when the fastening element is in its expanded, locking position. The locking means typically comprises a pair of toggle members pivotally connected together at their adjacent ends so that they are moveable between a collapsed position in which they can be inserted through an opening and an expanded position in which they secure the fastener within the opening. The connectors are joined to the toggle members at locations on the toggle members such that when the toggle members are moved into the expanded position, the connectors are forced apart relatively far from their conformation in the collapsed condition so that they extend radially outward far beyond the edges of the opening. In this structure, much of the load on the fastening element is borne by the relatively long, relatively flexible connector elements.

While the aforesaid fastening elements have proven to be highly satisfactory in a wide variety of applications, the present invention is directed to devices having features particularly useful in applications requiring high load-bearing capability.

DISCLOSURE OF THE INVENTION

In accordance with the present invention, an integrally molded plastic fastening element comprises a head portion, a body portion extending longitudinally from the head portion and having a pair of longitudinally extending pillar-like parts, and a pair of substantially rigid locking arms pivotally connected or pivotally disposed with respect to each other at their adjacent ends. The rigid locking arms are each pivotally connected to the body portion at the ends of the respective pillar-like parts at locations radially adjacent the cross-section of the body so that the rigid arms bear the bulk of the load applied to the fastener. The advantages of this structure include enhanced load bearing capability and ease of fabrication. In a preferred embodiment, the body is provided with a central passageway and the pillar-like parts are curved radially inwardly in order to spring bias the walls of the passageway against an elongated retaining member inserted therein and to spring bias the arms in an over-center locking position.

In another mode, the fastener comprises a further novel feature wherein the locking means comprises four more or less rigid arms arranged in a specific manner with respect to one another so as to create a symmetric pantographic configuration, i.e., a quadrilateral or four-sided polygon, in which three of the four angles or vertices are formed by flexible linkages and are each less than 180° when the fastener is installed. The fourth vertex, which is the one closest to the body portion, is formed between two opposed cantilever arms and about which such arms are pivotally disposed and engageable with an elongated retaining element (e.g., a screw), and is at least equal to or preferably slightly greater than 180° when the fastener is installed. The pair of arms forming the flexible linkage at the opposite apex are also engageable with such retaining element.

The fastening elements described herein can be fabricated of any convenient material. Desirably, the present fasteners can be formed of moldable, corrosion-resistant thermoplastic material, such as polyethylene, nylon, polyolefin, and the like. A preferred material is polypropylene, particularly high density or isotactic polypropylene, in view of its attractive mechanical properties including the ability to form so-called "living hinges", and its ability to be readily injection moded. Techniques for forming the fastening elements described herein will become apparent to those skilled in the art having the benefit of the present disclosure before them.

BRIEF DESCRIPTION OF THE DRAWINGS

The nature, advantages, and various additional features of the invention will appear more fully upon consideration of the illustrative embodiments described below in connection with the accompanying drawings, wherein:

FIG. 1 is a schematic cross-section of a typical prior molded plastic fastening element in the open or as-molded (solid line) and closed or collapsed (dotted line) position;

FIG. 2 is a perspective view of a first embodiment of the fastening element according to the invention showing the fastener in the attitude in which it is molded;

FIG. 3 is a side elevation of the fastener of FIG. 2;

FIG. 4 is a bottom plan view of the fastener of FIG. 2;

FIG. 5 is a section taken on the line A—A of FIG. 3;

FIG. 6 is a side elevation of a second embodiment of the fastening element according to the invention;

FIG. 7 is a bottom plan view of the fastener of FIG. 6;

FIG. 8 is a schematic cross-section of the fastener of FIG. 6 illustrating its use in conjunction with an elongated retaining member;

FIG. 11 is a side elevation of a fourth embodiment of the fastening element according to the invention;

FIG. 12A is a top plan view of the fastener of FIG. 11;

FIG. 12 B is a perspective view of one arm of the fastener of FIG. 11;

FIGS. 13A and 13B pertain to a fifth embodiment of the fastening element according to the invention which is similar to the type shown in FIG. 3, modified by the inclusion of arm reinforcing members;

For convenience of reference, the same structural elements are designated by the same reference numerals throughout the drawings.

BEST MODE FOR CARRYING OUT THE INVENTION

A. Prior Art (FIG. 1)

Figure 9:
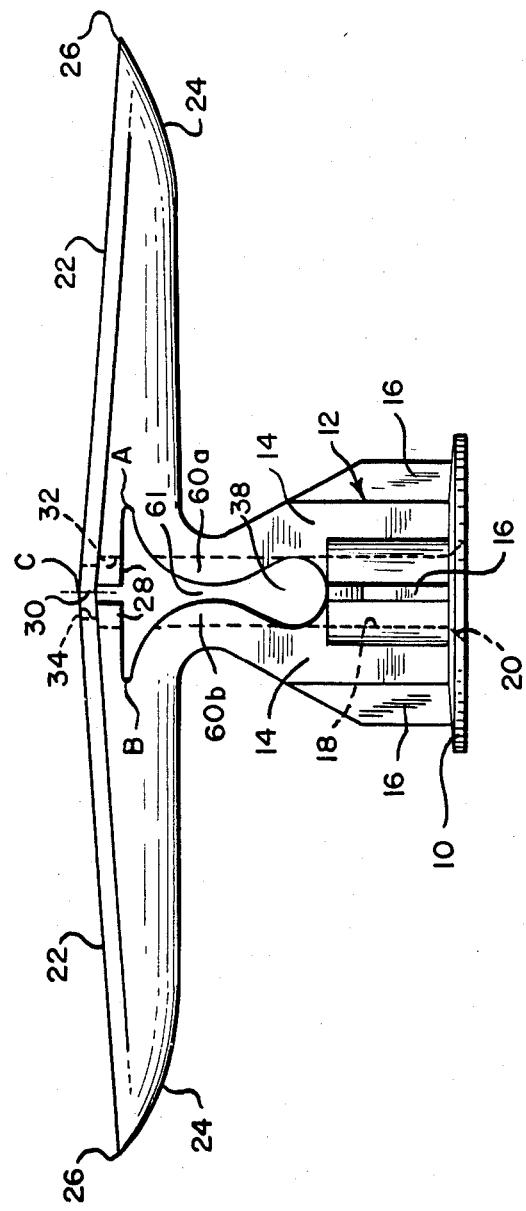
FIG. 9 is a side elevation of a third embodiment of the fastening element according to the invention.

Referring to FIG. 1, the prior art molded plastic fastening element shown therein comprises, in substance, a head 1 for disposition at one end of an opening 2, an expansible locking means in the form of toggle arms 3a and 3b for location at the other end of the opening, and flexible spaced apart connectors 4a and 4b extending therebetween.

Toggle arms 3a and 3b are pivotally connected together at their adjacent ends so as to be movable between a collapsed position 5 in which they can be inserted through opening 2, and the expanded position in which they secure the fastener within the opening.

The connectors 4a and 4b are typically joined to the toggle arms 3a and 3b substantially inflexibly and at remote locations 6a and 6b such that when the toggle arms move into expanded position, the connectors are forced apart and outward relatively far from their radial locations or situs in the collapsed condition so that the connectors extend far beyond the edges of the opening.

While fastening elements of this type have proved highly satisfactory in a great variety of applications, the present invention provides improved load bearing capability and ease of fabrication. With respect to load bearing capability, it can be seen by reference to FIG. 1 that the major portion of the load on the fastening element is borne by the long, flexible connectors 4a and 4b. Moreover, the toggle arms 3a and 3b are relatively thin throughout the major portion of their length because they, in the collapsed state, must share the limited available space in opening 2 with the long connectors 4a and 4b. These features necessarily limit the load bearing capability of such prior fastening element, especially when they are made of resilient plastic material.

With respect to ease of fabrication, it can be readily appreciated that remote joining locations 6a and 6b require thin knife edge components in the mold in order to define and create spaces 7a and 7b. Molding around such thin, knife edge components presents one of the more difficult aspects of fabricating these devices; and, because heat concentrating at the points of the knife edges tends to weaken the material being molded, particularly in the case of plastic, the molding step introduces points of potential weakness in the product.

B. First Embodiment (FIGS. 2 through 5)

In accordance with the invention, a molded plastic fastening element with enhanced load bearing capability and improved ease of fabrication is provided by connecting the toggle arms to the body at the ends of pillar-like parts in the region radially adjacent to or within the body cross-section. This structure eliminates the need for thin knife edge mold configurations and permits the use of substantially rigid toggle arms to bear the major portion of the load. FIGS. 2 through 5 illustrate a first embodiment of such a fastening element.

The fastener of FIGS. 2 through 5 comprises a head portion 10 of generally flanged or disc-like form, a body portion 12 disposed centrally upon and upstanding or extending longitudinally from head 10, and locking means described hereinbelow.

The body portion 12, as can be seen particularly in FIG. 2, is of generally circular cross-section, having a pair of diametrically opposed upstanding pillar-like portions 14 described more fully below. Spaced about the body 12 are fins 16, in this particular embodiment there being four such fins. Extending through head 10 and through body 12 is a central passage 18 which has a larger diameter portion 20 at the head end which serves as a counterbore.

The locking means comprises a pair of generally similarly shaped arms 22 each substantially greater in length than the diameter of body 12. Each arm 22 has, at its distal end, a smoothly curved surface 24 tapering to extremity 26. At their adjacent inner ends, the arms 22 are relieved as at 28 and are pivotally interconnected by means of a relatively thin, integral strap 30 so as to be movable in a vertical plane which includes the longitudinal axis of the body. The central passage 18 is continued as at 32 in the adjacent regions of the arms 22 and a through opening 34 is formed in strap 30, such opening being coaxial with passage 18.

The underside of each arm 22, i.e., that surface of the arm closest to head portion 10, is provided with a series transverse protuberances 36 formed in a saw tooth-like configuration, whose function is described more fully hereinbelow.

The arms 22 are joined to pillar-like portions 14 of body 12 at pivot points A and B, the upper regions of said pillar-like portions being slightly flexible to accommodate the pivoting movement of arms 22 about pivot point C at strap 30 and about pivot points A and B.

The upper end of body 12, i.e., that end of the body closest to arms 22, is relieved or recessed at 38 to accommodate the adjacent or proximal ends of said arms.

It can be seen from FIG. 3 that pivot points A, B, and C are disposed at the vertices of an isosceles triangle when the locking means are in their expanded position or conformation, i.e., in the position illustrated in the drawing. The line connecting pivot points A and B constitutes the base of the triangle and lines AC and BC constituting sides of the triangle. It is to be noted that sides AC and BC of the triangle are each of greater length than one-half the base AB.

In operation, a hole is first formed in a surface or panel within which the fastener is to be secured. The particular embodiment of the invention here illustrated is for use in providing an anchor into which a screw can be secured within a panel structure which would not ordinarily carry the load applied to a screw inserted directly into it, as for example, a gypsum board panel. The hole formed in such a panel is of slightly larger cross section than the cross-section of body 12 of the fastener. To insert the fastener, arms 22 are folded about pivots A, B, and C so that the upper surfaces of the arms, i.e., those surfaces remote from head 10, are brought into face-to-face relationship and the arms are disposed generally parallel to the axis of body portion 12 of the fastener. The fastener is then inserted through the opening with the fins 16 cutting into the marginal edges defining the opening of the panel to prevent rotation of the fastener upon the application of torque thereto.

It will be appreciated that, as indicated in the drawings, the length of the body from head 10 to the topmost portions of the pillar-like sections 14 corresponds approximately to the thickness of the panel into which the fastener is to be secured.

Preparatory to inserting the fastener into the hole, as mentioned earlier, the arms 22 are folded to the collapsed position in which they are generally parallel to the axis of the body portion 12. In so doing, pivot point C will move downward across the base line AB of triangle ABC. During insertion, as the arms 22 clear that end of the hole opposite the end from which the fastener is inserted, the arms will tend to move to their expanded position. A screw (not shown) inserted into the fastener will, with its leading end abutting the strap 30, cause the pivot point C to shift back to the position shown in FIG. 3 and the shank of the screw will fill the greater part of the recess 38 at the upper end of body 12 and between pillar portions 14. During the movement of arms 22 to their expanded position, the upper portion of each pillar 14 will flex slightly to allow pivot point C to move back across line AB. Pivots A and B will shift slightly apart and, as pivot C completes its movement upward, return to the position shown in FIG. 3. Passage 18 is desirably of lesser diameter than the screw for which the fastener is designed so that the screw threads will cut into the side walls of the passage as it is driven into the fastener, thereby increasing the degree of securement of the screw within the fastener.

The tooth-like protuberances 36 on the undersurfaces of arms 22 will now tend to resist any movement of the arms to a collapsed position and, of course, the major resistance to such movement will be the fact that the arms are, by virtue of the position of the pivot C, in an overcenter or toggled condition.

C. Second Embodiment (FIGS. 6 through 8)

FIGS. 6, 7, and 8 illustrate an alternative embodiment of the invention substantially the same as the embodiment of FIGS. 2 through 5 except that the pillar-like parts 14 include portions 60a and 60b curved radially inwardly into central passageway 18 to form a region 61 of restricted cross-sectional area.

Curved portions 60a and 60b, which can be termed memory springs, provide a spring force for biasing arms 22 into an over-center locking position after their insertion into an opening in the collapsed condition.

In addition, curved portions 60a and 60b provide a spring force for biasing the walls of central passageway 18 into engagement with an elongated threaded retaining element inserted therein, such as threaded screw 80 in FIG. 8. Because the curved plastic pillar portions 60a and 60b are biased into the passageway, restricted region 61 can accept retaining elements having a wide range of diameters. If the diameter is too large, passageway 18 can be forced open against the bias force.

Typically, the rotation of threaded screw 80 into central passageway 18 will tap or thread the portions 60c and 60b which define restricted region 61, thus providing enhanced engagement of the screw. This threading action provides positive resistance against over-rotation of the screw 80 and thus prevents collapse of toggle arms 22 in the event of excessive over-center displacement.

D. Third Embodiment (FIGS. 9 and 10)

Figure 10:
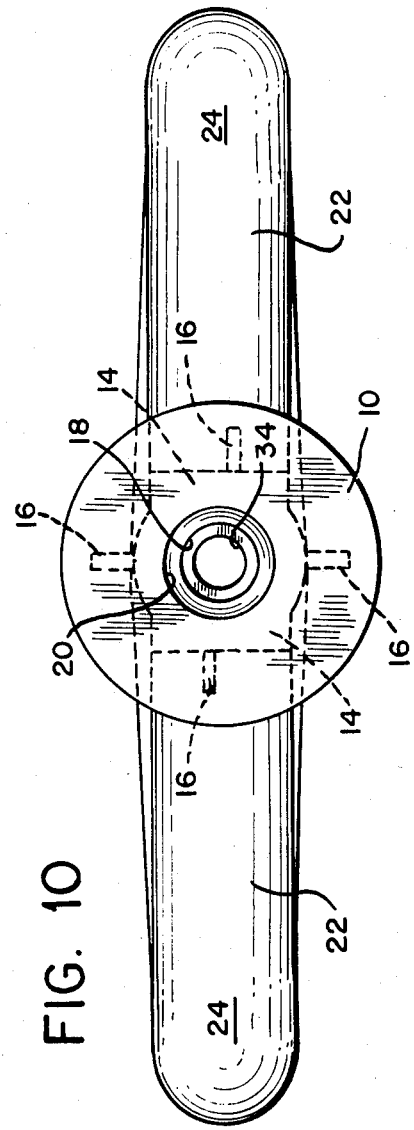
FIG. 10 is a bottom plan view of the fastener of FIG. 9.

FIGS. 9 and 10 illustrate a further alternative embodiment of the invention similar in structure and operation to the embodiment of FIGS. 6, 7, and 8, except that recessed portion 38 of body 12 is rounded in order to maximize the amount of material available in this area for engagement with a screw (not shown).

The fasteners of the first three embodiments described hereinabove in connection with FIGS. 2–10 are preferably formed of integrally molded plastic (e.g., polypropylene) structures. They are preferably molded in the open or expanded position in multicavity molds using conventional injection molding techniques, the details of which will be apparent to those skilled in the art having the benefit of the present disclosure before them.

E. Fourth Embodiment (FIGS. 11 throuqh 12B)

FIGS. 11, 12A and 12B illustrate a fourth embodiment of the invention wherein mechanical hinges 110 and 111 are located at pivot points A and B. As shown in FIG. 12B, each arm 22 is provided with a positive stop in the form of shoulder 112 to prevent pivotal rotation beyond the open position upon the insertion of an elongated retaining element (not shown). This embodiment can be fabricated of metal for applications where exceptionally great strength is required.

F. Fifth Embodiment (FIGS. 13A and 13B)

FIG. 13A illustrates a fifth embodiment of the invention similar to that described in connection with FIG. 3, except for the inclusion of elongated, rigid reinforcing members 130A and 130B in each of arms 22, respectively.

FIG. 13B is a top view of reinforcing members 130A and 130B. These members are preferably made of metal, e.g., steel, and can be incorporated into the plastic mate-

G. Sixth Embodiment (FIGS. 14A and 14B)

Figure 14B:
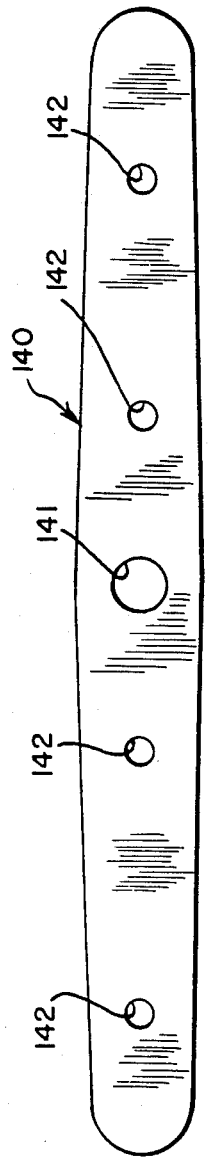
FIGS. 14A and 14B pertain to a sixth embodiment of the fastening element according to the invention which is similar to the type shown in FIG. 9, modified by the inclusion of a first type of arm reinforcing member.
Figure 14A:
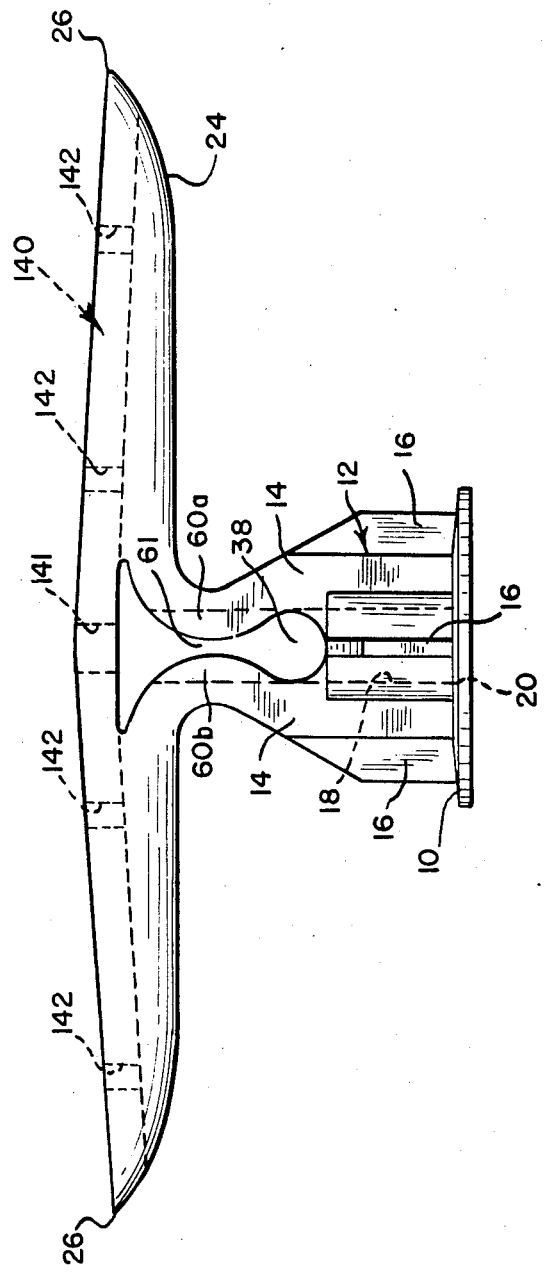

FIG. 14A illustrates a sixth embodiment of the invention similar to that described in connection with FIG. 9, except for the attachment of a perforated, bendable reinforcing member 140 across the outer portion of arms 22.

FIG. 14B is a top view of reinforcing member 140. The member 140, which can be made of bendable metal, is perforated by opening 141 for alignment with central passageway 18. In addition, a plurality of openings 142 are preferably provided for permitting penetration of plastic during molding so that member 140 is firmly attached to the fastener structure.

H. Seventh Embodiment (FIGS. 15A and 15B)

Figure 15A:
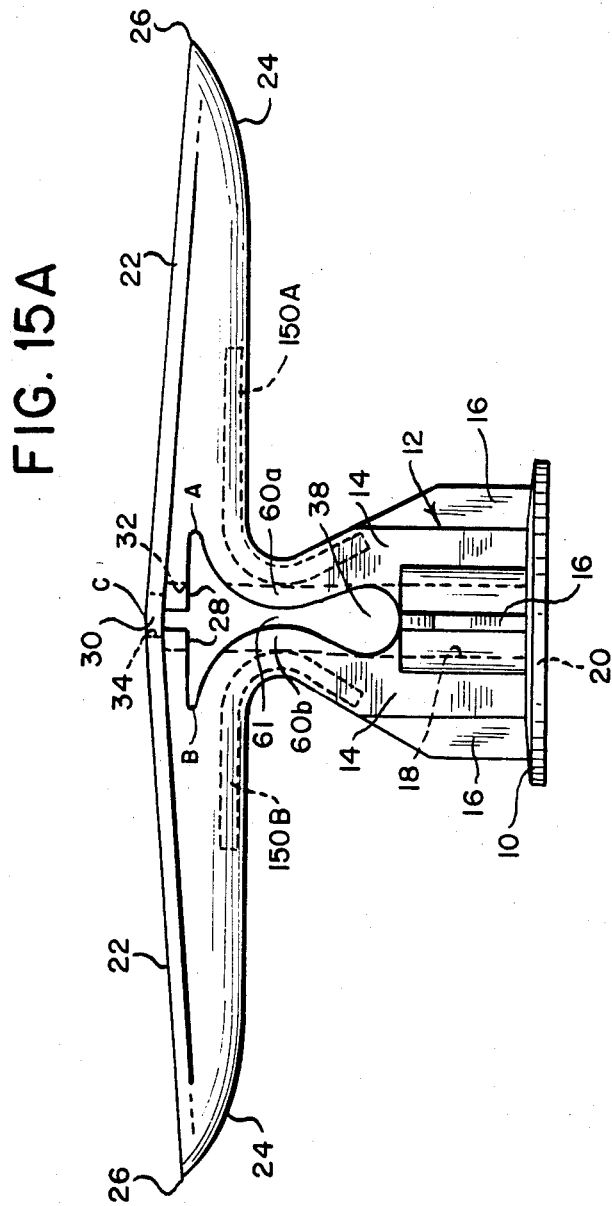
FIGS. 15A and 15B pertain to a seventh embodiment of the fastening element according to the invention which is similar to the type shown in FIG. 9, modified by the inclusion of a second type of arm reinforcing member.

FIG. 15A illustrates a seventh embodiment of the invention similar to that described in connection with FIG. 9, except for the inclusion of spring-like reinforcing members 150A and 150B beneath and across the points A and B in the region where arms 22 are pivotally attached to pillar-like portions 14 of body 12.

Figure 15B:
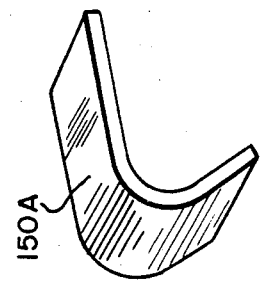

FIG. 15B is a perspective view of one such member 150A, which can be conveniently made of spring steel. Member 150A can be incorporated into body 12 by conventional insert molding techniques.

I. Eighth Embodiment (FIG. 16)

Figure 16:
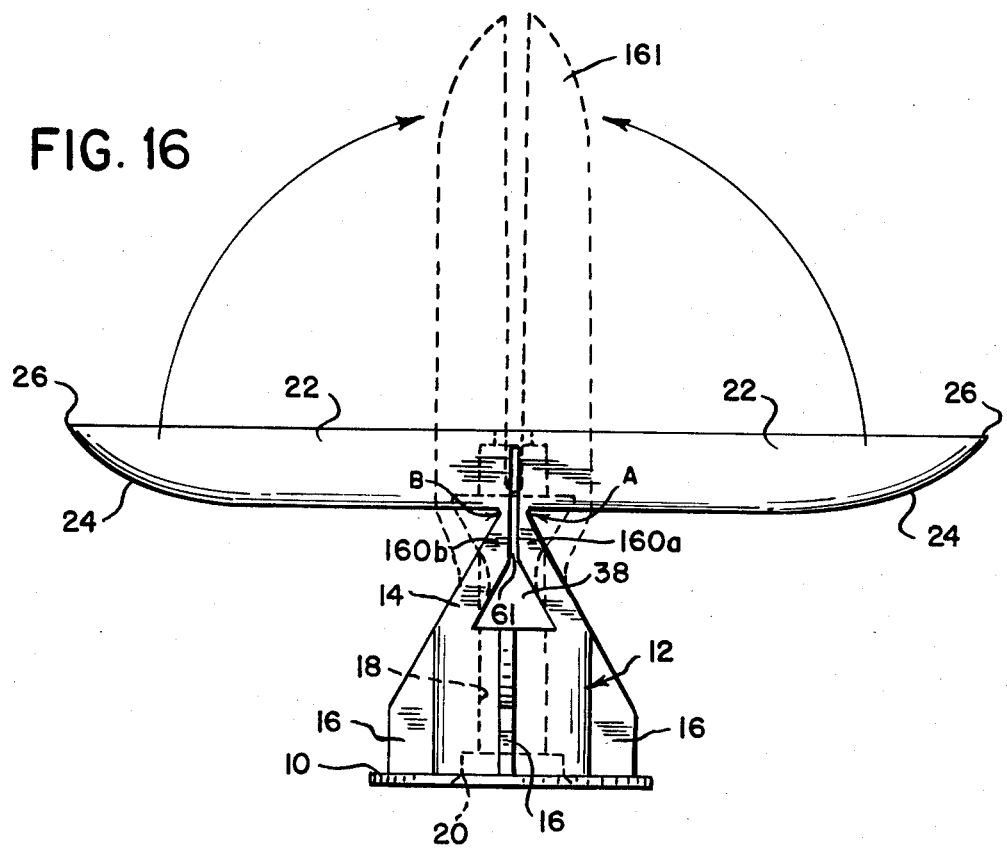
FIG. 16 is a side elevation of an eighth embodiment of the fastening element according to the invention in the open or as-molded (solid line) and closed or collapsed (dotted line) position.

FIG. 16 illustrates an eighth embodiment of the invention similar to that described in connection with FIG. 6, except that pillars 14, rather than being curved radially inwardly with respect to passageway 18, are straight but inclined radially inwardly at portions 160A and 160B in order to form region 61 of restricted cross-sectional area. This inclined structure performs the same functions as its curved counterpart, including spring biasing of arms 22 into locking position after insertion of the fastener through a hole. While the pivotal connections A and B are radially adjacent to body 12 in the collapsed position 161, they are well within the body radius in the expanded position.

J. Ninth Embodiment (FIGS. 17A and 17B)

Figure 17A:
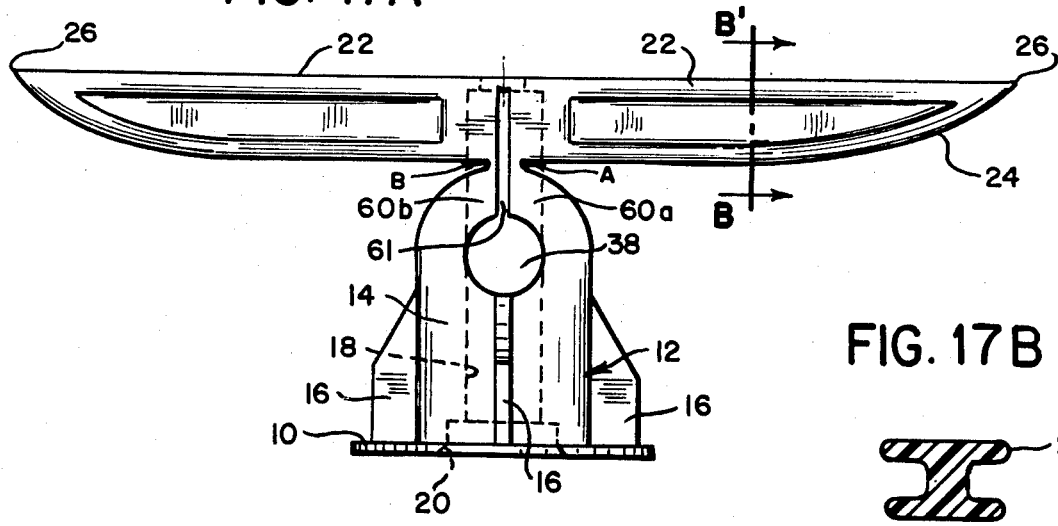
FIG. 17A is a side elevation of a ninth embodiment of the fastening element according to the invention.
Figure 17B:
FIG. 17B is a section taken on the line B—B' of FIG. 17A.

FIG. 17A illustrates a ninth embodiment of the invention similar to that described in connection with FIGS. 6 and 16, except that arms 22 have a contoured transverse cross-section to enhance their rigidity. Specifically, as shown in the cross-sectional view of FIG. 17B, each arm 22 is provided with an I-beam cross-section. It should be noted that while the pillar-like parts 14 of FIG. 17A have curvature in the opposite direction from the curvature of the corresponding parts in FIG. 6, the result in both embodiments is substantially the same, i.e., the pillars serve as spring-like members for opening the fastener, and portions of the pillars are biased into the central passageway 18. It should also be noted that in this embodiment, as in that of FIG. 16, the arm pivots A and B in the expanded position are radially within the body 12.

Figure 18:
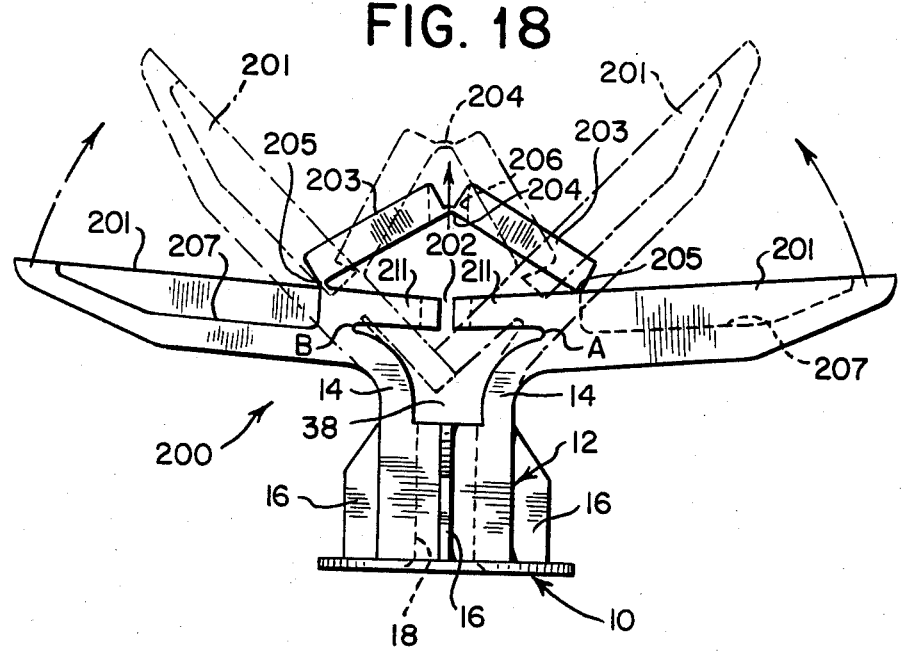
FIG. 18 is a side elevation of a further novel and inventive fastening element in the open or as-molded (solid line) and partially closed or collapsed (dotted line) position.
Figure 19:
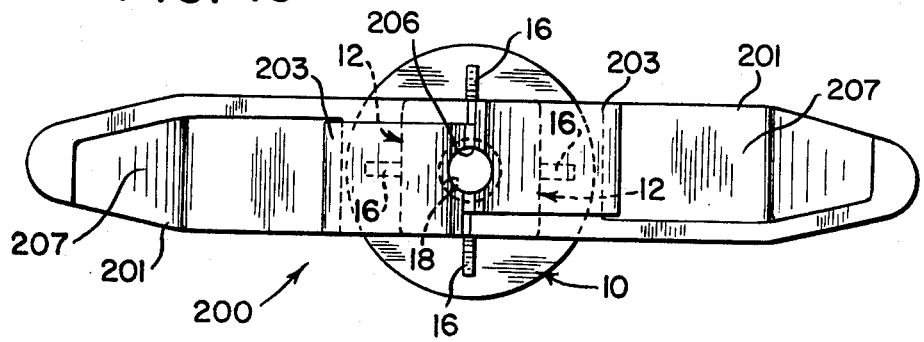
FIG. 19 is a top plan view of the fastener of FIG. 18.
Figure 20:
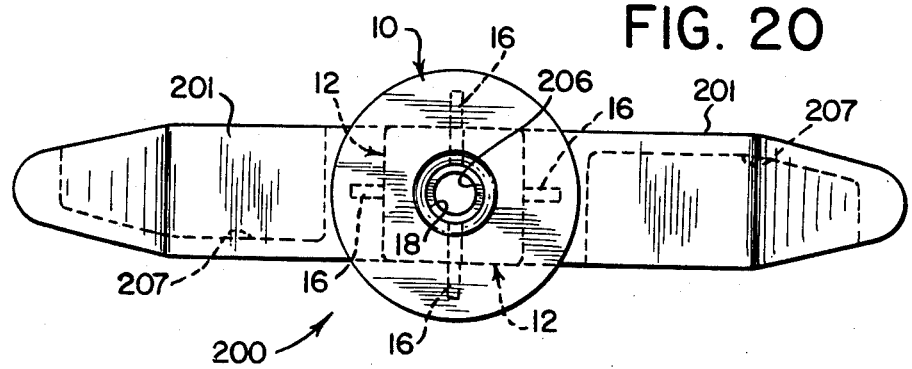
FIG. 20 is a bottom plan view of the fastener of FIG. 18.

K. FIGS. 18 through 20

The fastener 200 of FIGS. 18 through 20, like those of FIGS. 2 through 17B, comprises a head portion 10 of generally flanged disc-like form, and a shank or body portion 12 disposed centrally upon and upstanding from the head portion. However, fastener 200 represents a departure from the other fasteners described hereinabove in that it comprises a further novel and unusual locking means having a configuration which differs from the locking means of the previously described fasteners, while possessing certain advantages as described hereinbelow:

The body portion 12, as can be seen in FIGS. 18, 19 and 20, is of a generally quadrilateral, e.g., square, cross-section, and whose upper end segues into a pair of opposed pillar-like portions 14 described more fully hereinafter. Spaced about the body 12 are fins 16, in this particular embodiment there being four such fins. Extending through head 10 and through body 12 is a central bore or passage 18.

Figure 23:
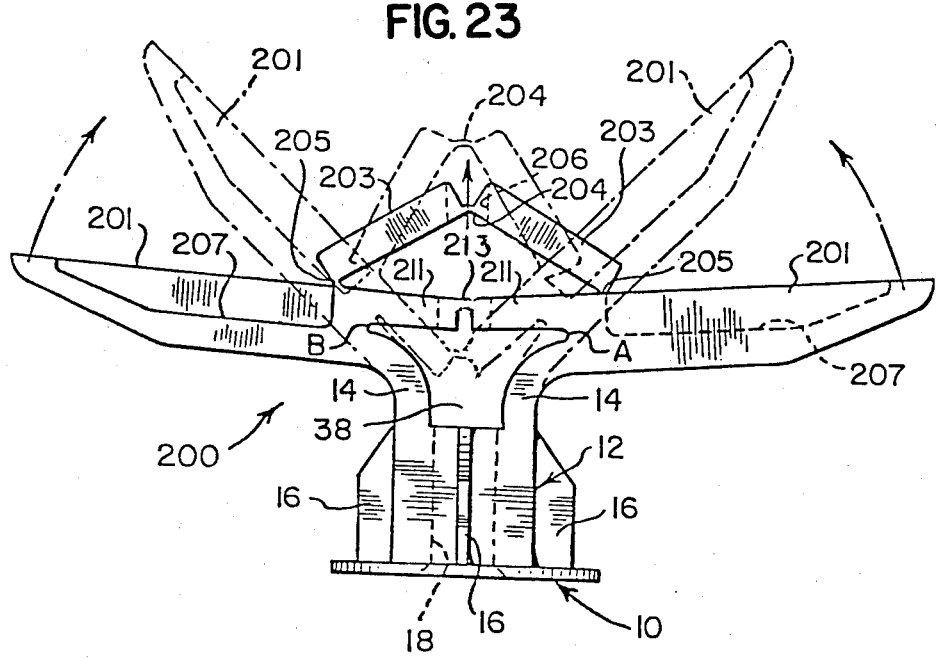
FIG. 23 is a further embodiment of the anchor of FIG. 18 with a flexible integral strap.

The novel locking means of this further inventive embodiment comprises a first pair of generally similar rigid arms 201 each substantially greater in length than the lateral or transverse dimensions of body portion 12. The adjacent inner ends of the arms 201 terminate in cantilevers 211 whose ends are separated by a gap 202 about which the arms are pivotally movable relative to each other in a vertical plane which includes the longitudinal axis of body portion 12. Alternatively, in lieu of gap 202, the cantilevered adjacent inner ends 211 of arms 201 can be joined by a flexible integral strap 213 of sufficient elasticity to permit the aforesaid pivotal movement of arms 201, as shown in FIG. 23. Such a strap, if used, should have an opening coaxial with passage 18 to permit the passage therethrough of a suitable retaining element such as a screw (not shown).

The rigid arms 201 are each joined to the pillar-like portions 14 of body 12 in the general regions of points A and B, said pillar-like portions 14 being somewhat flexible to accommodate the movement of arms 201 about pivot points A and B.

As can be seen in FIG. 18, the upper end of body 12, i.e., that end of the body closest to rigid arms 201, terminates in a cavity 38 which can accommodate the adjacent or proximal cantilevered ends 211 of said arms as the locking means are folded (dotted line) in the direction of the collapsed conformation.

The locking means further comprises a second pair of generally equal-length rigid arms 203 whose proximal ends are pivotally interconnected by means, e.g., of a relatively thin, flexible, integral strap 204 and whose distal ends are pivotally connected to the upper surfaces of arms 201, also by means, e.g., of relatively thin, flexible, integral straps 205. The interconnection of arms 203 at 204 is such that the center thereof coincides with the longitudinal axis of body portion 12, and the interconnections of arms 203 with arms 201 at 205 are essentially equidistant from said longitudinal axis. In this way, arms 203 are movable in concert with arms 201 in the manner of a symmetrical pantograph in a vertical plane which includes the longitudinal axis of body 12. The flexible strap 204 is advantageously provided with a through opening 206 which can best be seen in FIG. 19.

In operation, when the fastener 200 is to be inserted into a hole or aperture in a structure such as a panel or hollow wall, arms 201 are folded around points A and B with 202 as the pivot, so that the upper surfaces of these arms, i.e., those surfaces remote from base 10, are brought into face-to-face relationship, while at the same time the lower surfaces of arms 203, i.e., those surfaces closest to base 10, are likewise brought into face-to-face relationship by the pivotal movement of these arms about 204, as shown by the arrows in FIG. 18, both pairs of arms being thereby disposed generally parallel to the longitudinal axis of body portion 12. In such closed conformation, arms 203 are accommodated or nested within recesses 207 provided in the upper surfaces of arms 201, thereby permitting all four arms to share the limited space available in the opening through which the fastener is inserted.

During insertion of fastener 200 through a hole, as the folded or collapsed arms 201 (with folded arms 203 nested therein) clear the opposite end of the hole (until the flange of head 10 abuts the outer surface of the panel or the fixture to be secured thereto), the arms will unfold somewhat and, in the manner of a pantograph, tend to move toward their expanded positions, with adjacent arms 201 and 200 forming reverse acute angles with vertices at 205. A rigid elongated, (preferably) corrosion-resistant retaining element or member designed to engage arms 203 at pivot point 204 and the cantilevered end portions 211 of arms 201 at pivot 202, e.g., a threaded screw (not shown), is then inserted into fastener 200 thus installed within the hole. A critical feature of this invention is that when the retaining element is tightened in place, the aforementioned acute reverse angles formed by arms 201 and 203 are reduced to a minimum value, while the obtuse angle formed by arms 203 is increased to a more or less maximum value (but less than 180°), depending on the relative lengths of arms 201 and 203, as can be readily envisioned by reference to FIG. 18. At the same time, the angle formed by arms 201 with vertex at 202 is increased from an amount less than 180° to a maximum value of at least equal to or slightly greater than 180°. In this way, the retaining member will, with its leading end portion engaging strap 204 and its shank engaging the proximal cantilevered ends 211 of arms 201, secure the fastener in its open, load-bearing conformation by virtue of the cooperative forces or purchase exerted (in the upward direction in the drawing) by the retaining member upon strap 204 and upon cantilevered ends 211, which gives rise to and maintains the abutting force of arms 201 against the inner surface of the panel and the opposed abutting force of the flange of head 10 against the outer surface of the panel. When the retaining member is removed, the fastener 200 remains in place for re-use. Alternatively, the fastener can be removed from the hole by withdrawing the retaining member and then pulling the fastener out of the hole in the opposite direction in which it was inserted.

In the embodiment shown in FIGS. 18, 19 and 20, all of the various structural features of the fasteners described hereinabove can be incorporated therein to the extent consistent with the structure and mode of function of the present further invention, as will be apparent to those skilled in the art having the benefit of the present disclosure before them.

Figure 21:
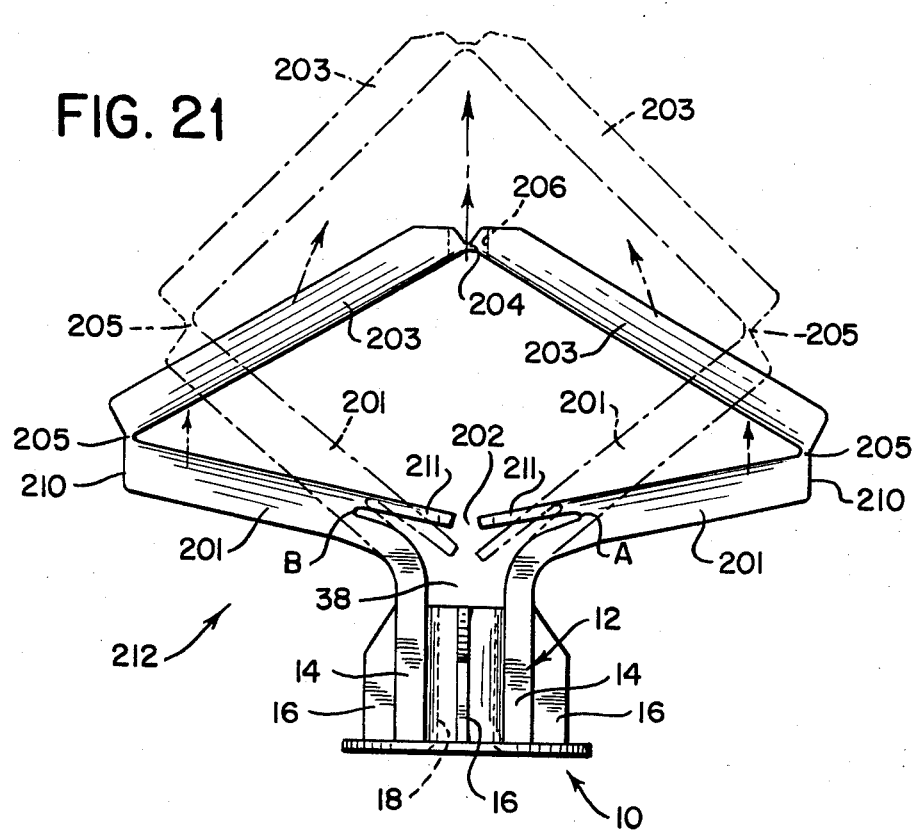
FIG. 21 is a side elevation of a further novel and inventive fastening element in the open or as-molded (solid line) and partially closed or collapsed (dotted line) position.
Figure 22:
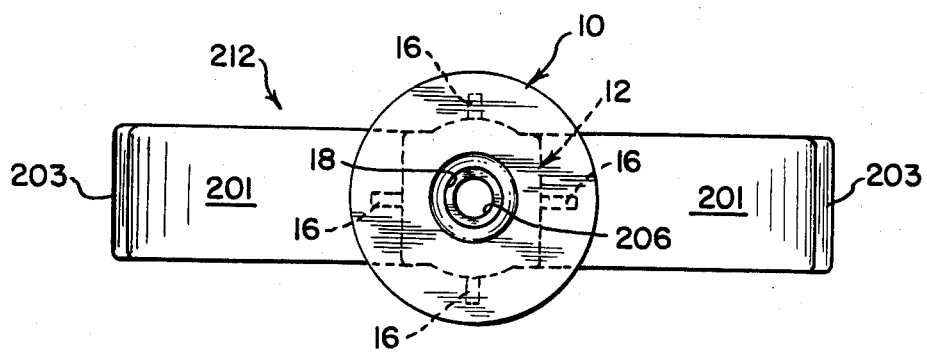
FIG. 22 is a bottom plan view of the fastener of FIG. 21.

L. FIGS. 21 and 22

FIGS. 21 and 22 illustrate another fastener embodiment 212 of the novel structural principles described in connection with the fastener shown in FIGS. 18 through 20. In the present embodiment, rigid equal length arms 203 are joined at their distal ends to the respective distal ends 210 of rigid equal length arms 201 by means of flexible linkages 205 in the form of relatively thin integral straps. The base 10, body portion 12, pillar-like portion 14 and fins 16 are of a configuration essentially the same as that described in connection with FIG. 2 et seq.

In the operation of fastener 212, as the locking means are folded (dotted line) in the direction of their closed position preparatory to insertion through a hole or aperture in a structure such as a panel or hollow wall, arms 201 and 203 rotate pivotally to achieve the movement of a symmetrical pantograph in the manner indicated by the arrows in FIG. 21 until both pairs of arms are aligned in sequential fashion parallel to the longitudinal axis of body portion 12. In such conformation, the cantilevered proximal ends 211 of arms 201 are accommodated within space 38 formed at the upper end of body 12.

During insertion of fastener 212 through a hole, as the folded or collapsed pairs of arms 201 and 203 clear the opposite end of the hole (until the flange of head 10 abuts the outer surface of the panel or the fixture to be secured thereto), the arms will unfold somewhat and, in the manner of a pantograph, tend to move toward their expanded positions, with adjacent arms 201 and 203 forming reverse acute angles with vertices at 205. An elongated retaining element or member, e.g., a threaded screw, such as a sheet metal screw (preferably made of stainless steel or suitably coated on plated metal for corrosion resistance), is then inserted into fastener 200 thus installed within the hole. As in the case of the fastener of FIGS. 18-20, a critical feature of the invention here is that when the retaining member is tightened in place, the aforementioned reverse acute angles formed by arms 201 and 203 are reduced to a minimum value, while the obtuse angle formed by arms 203 is increased to a more or less maximum value (but less than 180°), depending on the relative lengths of arms 201 and 203, as can be readily envisioned by reference to FIG. 21. At the same time, the angle formed by arms 201 with vertex at 202 is increased from an amount less than 180° to a maximum value of at least equal to or slightly greater than 180°. In this way, the retaining member will, with its leading end portion engaging strap 204 and its shank engaging the proximal cantilevered ends 211 of arms 201, secure the fastener in its open, load-bearing conformation by virtue of the cooperative forces or purchase exerted (in the upward direction in the drawing,) by the retaining member upon strap 204 and upon cantilevered ends 211, which gives rise to and maintains the abutting force of arms 201 against the inner surface of the panel and opposed abutting form of the flange of head 10 against the outer surface of the panel. When the retaining member is removed, the fastener 212 remains in place for re-use. Alternatively, the fastening element can be removed from the hole by withdrawing the retaining member and then pulling the fastener out of the hole in the opposite direction in which it was inserted.

In the embodiment shown in FIGS. 21 and 22, all of the various structural features of the fasteners described hereinabove can be incorporated therein to the extend consistent with the structure and mode of function of the present further invention, as will be apparent to those skilled in the art having the benefit of the present disclosure before them.

The flexible straps 204 and 205 referred to in connection with FIGS. 18 through 21, when the fastener is molded from thermoplastic, particularly polypropylene, form so-called "living hinges". These are formed by reducing the molded thickness of the respective arms 201 and 203 at the ends where they are joined. The thicknesses of the hinges are a matter of design choice, a thinner hinge being more flexible but less durable (in terms of number of flexings before failure) and vice versa.

While the invention has been described in connection with a number of specific embodiments, it is to be understood that these are merely illustrative of the many ways in which the principle of the invention described in connection with FIGS. 18 through 22 can be utilized. For example, while the body portion of the fastener has been described as being either basically parallelepiped or cylindrical in shape, this is merely a matter of convenience and such body can take any of several forms depending upon the particular opening or aperture through which the body is to be passed and upon molding considerations. It will also be appreciated that while the embodiments illustrated hereinabove are specifically designed to provide anchors for screws, they can be readily adapted for various other uses ranging from simple cuff link-type structures to hook devices, depending upon the result required. Thus, numerous and varied devices can be made by those skilled in the art without departing from the scope of the invention which is defined in the following claims.

I claim:

1. A fastening element for securement within an opening in a hollow wall comprising (a) a head portion; (b) a connecting portion comprising a body extending longitudinally from the head portion and a pair of opposed pillar-like parts, for insertion into such opening; and (c) at the end of said connecting portion remote from the head portion, locking means for engagement with an inner surface of said hollow wall, said locking means being movable between a collapsed position in which the fastening element is insertable into the opening and an expanded position in which the locking means is effective, in cooperation with an elongated retaining element inserted into the connecting portion, to preclude removal of the fastening element from the opening, wherein said locking means comprises:
   (i) a pair of substantially rigid arms pivotally connected to the pillar-like parts at radial locations substantially adjacent to or within the radius of the body in the expanded position and disposed to pivot with respect to each other in a plane which includes the longitudinal axis of said body, whereby the arms are movable toward each other to a collapsed position for insertion thereof into said opening, and away from each other to an expanded position, for supporting engagement thereof with said inner surface of said wall, each arm being of substantially greater length than the maximum transverse dimension of the body portion; and
   (ii) a pair of substantially rigid arms, each pivotally connected to one of arms (i) and pivotally connected to each other on the longitudinal axis of the body for engagement with the elongated retaining element, whereby such arms (ii) are movable toward each other to a collapsed position and away from each other to an expanded position, so as to be engageable with the elongated retaining element, each arm (ii) being of substantially greater length than the maximum transverse dimension of the body, the improvement comprising said arms (i) and (ii) being conjointly movable in symmetric pantographic configuration between said collapsed and expanded positions in a plane which includes the longitudinal axis of the body and wherein said arms (i) have proximal end portions which are cantilevered for engagement with the elongated retaining element in said expanded position, with said arms (i) forming an angle between them of 180° after moving through said pantographic configuration into said expanded position, and wherein said arms (ii) are engaged with the elongated retaining element, in said expanded position, with said arms (ii) forming an obtuse angle between them.

2. A fastening element for securement within an opening in a hollow wall comprising (a) a head portion; (b) a connecting portion comprising a body extending longitudinally from the head portion and a pair of opposed pillar-like parts, for insertion into such opening; and (c) at the end of said connecting portion remote from the head portion, locking means for engagement with an inner surface of said hollow wall, said locking means being movable between a collapsed position in which the fastening element is insertable into the opening and an expanded position in which the locking means is effective, in cooperation with an elongated retaining element inserted into the connecting portion, to preclude removal of the fastening element from the opening, characterized in that said locking means comprises:
   (i) a pair of substantially rigid arms pivotally connected to the pillar-like parts at radial locations substantially adjacent to or within the radius of the body in the expanded position and wherein said fastening element is adapted to be engaged with the elongated retaining element at a position between the proximal end portions of said arms, said arms being disposed to pivot with respect to each other in a plane which includes the longitudinal axis of said body, whereby the arms are movable toward each other to a collapsed position, for insertion thereof into said opening, and away from each other to an expanded position, for supporting engagement thereof with said inner surface of said wall, while forming an angle between them at least 180°, each arm being of substantially greater length than the maximum transverse dimension of the body portion; and
   (ii) a pair of substantially rigid arms, each pivotally connected to one of the arms (i) and pivotally connected to each other on the longitudinal axis of the body for engagement with the elongated retaining element, whereby such arms (ii) are movable toward each other to a collapsed position and away from each other to an expanded position, so as to be engageable with the elongated retaining element, each arm (ii) being of substantially greater length than the maximum transverse dimension of the body, and said arms (i) and (ii) being conjointly movable in symmetric pantographic configuration between said collapsed and expanded positions in a plane which includes the longitudinal axis of the body and wherein each of arms (ii) is pivotally connected at its distal end to one of arms (i) at locations intermediate the ends of said arms (i) and equidistant from the longitudinal axis of the body.

3. The fastening element for securement within an opening in a hollow wall comprising (a) a head portion; (b) a connecting portion comprising a body extending longitudinally from the head portion and a pair of opposed pillar-like parts, for insertion into such opening; and (c) at the end of said connecting portion remote from the head portion, locking means for engagement with an inner surface of said hollow wall, said locking means being movable between a collapsed position in which the fastening element is insertable into the opening and an expanded position in which the locking means is effective, in cooperation with an elongated retaining element inserted into the connecting portion, to preclude removal of the fastening element from the opening, characterized in that said locking means comprises:

(i) a pair of substantially rigid arms pivotally connected to the pillar-like parts at radial locations substantially adjacent to or within the radius of the body in the expanded position and wherein said fastening element is adapted to be engaged with the elongated retaining element at a position between the proximal end portions of said arms, said arms being disposed to pivot with respect to each other in a plane which includes the longitudinal axis of said body, whereby the arms are movable toward each other to a collapsed position, for insertion thereof into said opening, and away from each other to an expanded position, for supporting engagement thereof with said inner surface of said wall, while forming an angle between them of at least 180°, each arm being of substantially greater length than the maximum transverse dimension of the body portion; and (ii) a pair of substantially rigid arms, each pivotally connected to one of the arms (i) and pivotally connected to each other on the longitudinal axis of the body for engagement with the elongated retaining element, whereby such arms (ii) are movable toward each other to a collapsed position and away from each other to an expanded position, so as to be engageable with the elongated retaining element, each arm (ii) being of substantially greater length than the maximum transverse dimension of the body, and said arms (i) and (ii) being conjointly movable in symmetric pantographic configuration between said collapsed and expanded positions in a plane which includes the longitudinal axis of the body and wherein each of arms (ii) is pivotally connected at its distal end to one of arms (i) at locations intermediate the ends of said arms (i) an equidistant from the longitudinal axis of the body and wherein each of arms (ii) is adapted to become completely recessed within one of arms (i) when said arms (i) and (ii) are in the collapsed position.

4. The fastening element according to claim 1 wherein each of arms (ii) is pivotally connected at its distal end to the distal end of one of arms (i), said arms (i) being of equal length and said arms (ii) being of equal length.

5. The fastening element according to claim 1, 2, 3 or 4 wherein:

each of arms (ii) is pivotally connected to one of arms (i) by a flexible integral strap; and arms (ii) are connected to each other at their proximal ends by a flexible integral strap.

6. The fastening element according to claim 5 wherein a central region of the body adjacent to said locking means is recessed to accommodate the proximal cantilevered end portions of arms (i) when the locking means are in the collapsed position.

7. The fastening element according to claim 6 wherein the cantilevered end portions of the respective arms (i) are separated by a space in order to facilitate their entry into and accommodation within the recessed region of the body.

8. The fastening element according to claim 5 wherein the body includes a central passageway for receiving the elongated retaining element.

9. The fastening element according to claim 5 wherein the fastening element is integrally molded from thermoplastic material.

10. The fastening element according to claim 9 wherein the thermoplastic material is polypropylene.

11. A screw anchor for installation, in cooperation with a screw inserted therein, in a hole drilled in a hollow wall, said anchor being molded of synthetic plastic material and comprising:

A. a shank constituted by a pair of front arms and a pair of rear arms, said front arms being hinged together by a front apex hinge having an opening therein, said front arms being joined to said rear arms by side apex hinges, the ends of said rear arms defining a rear apex; and B. a body attached to said shank adjacent said rear apex by a pair of normally outstretched resilient webs that merge with said rear arms, said webs having a memory resulting in the return of the webs to their normal state when the webs are flexed and thereafter released, whereby when said shank is folded into a collapsed conformation, it is capable of being inserted in said hole, making it possible to seat said body therein; said folded shank, after passing through the hole, then being caused by the webs to unfold towards its original configuration, said webs having a length permitting hinging thereof adjacent the inner surface of said hollow wall at a point determined by the length of the body relative to the thickness of said hollow wall, said body having a bore in registration with said front apex opening;

C. the improvement comprising said front arms and rear arms being conjointly movable in a symmetric pantographic configuration when said shank is being folded into said collapsed conformation and returned toward its original configuration after said insertion in said hole, said anchor being adapted such that, after said insertion, a screw is turnable into said bore, and is threadably engaged thereby, with said screw then advancing to engage the ends of said rear arms and spreading them apart to begin transforming the shank into a truss, whose bottom chord is formed by said rear arms and is pressed against the inner surface of said wall to prevent removal of said anchor, said truss being completed when said advancing screw then enters and threadably engages the opening in the front apex hinge, while remaining in engagement with the ends of said rear arms, and said bottom chord is formed, with said screw thereby defining a central strut between the front apex of the truss and the rear arms, wherein said front apex and the ends of said rear arms are engaged with said screw, whereby said front arms and legs are prevented from conjointly moving in said pantographic configuration, and whereby the truss may be collapsed by withdrawal of the screw to permit said movement of said front and rear arms in said pantographic configuration for removal of the anchor from the hole.

12. An anchor as set forth in claim 11, wherein said body has a front flange which lies against the outer surface of the wall.

13. An anchor as set forth in claim 12, wherein said flange has a mounting fixture integral therewith for supporting an object.

14. An anchor as set forth in claim 11, wherein said body is provided with longitudinally extending fins which cut into the wall surrounding said hole to prevent rotation of the anchor but which do not resist axial withdrawal thereof.

15. An anchor as set forth in claim 11, wherein said plastic material is polypropylene.

16. A screw anchor for installation, in cooperation with a screw inserted therein, in a hole drilled in a hollow wall, said anchor being molded of synthetic plastic material and comprising:
  A. a shank constituted by a pair of front arms and a pair of rear arms, said front arms being hinged together at a front apex having an opening therein, said front arms being joined to said rear arms by side apex hinges, the ends of said rear arms defining a rear apex; and
  B. a body attached to said shank adjacent said rear apex by a pair of normally-outstretched resilient webs that merge with said rear arms, said webs having a memory resulting in the return of the webs to their normal state when the webs are flexed and thereafter released, whereby when said shank is folded into a collapsed conformation, it is capable of being inserted in said wall hole, making it possible to seat said body therein; said folded shank, after passing through the wall hole, then being caused by the webs to unfold towards its original configuration, said webs having a length permitting hinging thereof adjacent the inner surface of said hollow wall at a point determined by the length of the body relative to the thickness of said hollow wall, said body having a bore in registration with said front apex opening;
  C. the improvement comprising said front arms and rear arms being conjointly movable in a symmetric pantographic configuration when said shank is being folded into said collapsed conformation and returned toward its original configuration after said insertion in said hole, said anchor being adapted such that, after said insertion, a screw is receivable in said bore, with said screw then entering and engaging the ends of said rear arms and threadably engaging the opening in the front apex, while remaining in engagement with the ends of said rear arms, to cause said front and rear arms to form a truss against said wall whose bottom chord is formed by said rear arms, with said bottom chord being pressed against the inner surface of said wall, with said screw defining a central strut between the front apex of the truss and the rear arms, with said front apex and the ends of said rear arms being engaged with said screw, whereby said front and rear arms are prevented from conjointly moving in said pantographic configuration, and whereby the truss may be collapsed by withdrawal of the screw to permit said movement of said front and rear arms in said pantographic configuration for removal of the anchor from the hole.

17. An anchor as set forth in claim 16, wherein the ends of the rear legs are joined together by a flexible integral strap of sufficient elasticity to permit said movement in a pantographic configuration, with said strap having an opening therein to accommodate the screw received in the body.

18. An anchor as set forth in claim 16, wherein said hollow wall has a predetermined thickness and said webs have a length causing a portion of the webs, in the event the body is shorter than the wall hole, to act as an extension of the body to make up the shortage.

* * * * *